US007365267B2

(12) United States Patent
Kim

(10) Patent No.: US 7,365,267 B2
(45) Date of Patent: Apr. 29, 2008

(54) GROUND ROD HAVING INDUCTION DISCHARGE SKIN-EFFECT PLATE

(76) Inventor: Dong-Jin Kim, 1677-7 Bongcheon-Dong, Kwanak-Gu, Seoul (KR)

(*) Notice: Subject to any disclaimer, the term of this patent is extended or adjusted under 35 U.S.C. 154(b) by 0 days.

(21) Appl. No.: 11/668,982

(22) Filed: Jan. 30, 2007

(65) Prior Publication Data

US 2007/0181323 A1 Aug. 9, 2007

(30) Foreign Application Priority Data

Feb. 3, 2006 (KR) ..................... 10-2006-0010675

(51) Int. Cl.
*H02G 13/00* (2006.01)

(52) U.S. Cl. .......................................... 174/3; 361/117

(58) Field of Classification Search .................... 174/3, 174/5 R, 6, 7, 51; 361/117, 216, 220, 222, 361/219; 403/305-307; 81/52, 488, 489
See application file for complete search history.

(56) References Cited

U.S. PATENT DOCUMENTS 4,760,213 A * 7/1988 Gumley ......................... 174/3

FOREIGN PATENT DOCUMENTS

KR 1020010025150 4/2001

* cited by examiner

*Primary Examiner*—Dhiru R Patel
(74) *Attorney, Agent, or Firm*—IPLA P.A.; James E. Bame

(57) ABSTRACT

A ground rod having an induction discharge skin-effect plate is disclosed, in which an electric current inputted into a ground rod can be easily discharged to the ground by forming an induction discharge skin-effect plate in parallel with a ground rod at a certain interval and increasing a critical surface area when a thunderbolt falls. In addition, an electric potential increase of the ground can be lowered by allowing an electric potential discharge to take place between the upper and lower vertical portions of a ground rod and an induction discharge skin-effect plate when a thunderbolt falls.

3 Claims, 6 Drawing Sheets

GROUND ROD HAVING INDUCTION DISCHARGE SKIN-EFFECT PLATE

CROSS REFERENCE

Applicant claims foreign priority under Paris Convention and 35 U.S.C. §119 to the Korean Patent Application No. 10-2006-0010675, filed Feb. 3, 2006 with the Korean Intellectual Property Office.

BACKGROUND OF THE INVENTION

1. Field of the Invention

The present invention relates to a ground rod having an induction discharge skin-effect plate, and in particular to a ground rod having an induction discharge skin-effect plate in which an electric current inputted into a ground rod can be easily discharged to the ground by forming an induction discharge skin-effect plate in parallel with a ground rod at a certain interval and increasing a critical surface area when a thunderbolt falls. In addition, an electric potential increase of the ground can be lowered by allowing an electric potential discharge to take place between the upper and lower vertical portions of a ground rod and an induction discharge skin-effect plate when a thunderbolt falls.

2. Description of the Background Art

Generally, a ground rod is a facility which is designed to protect all kinds of electric and electronic instruments and facilities such as a power generator, a transformer, a reactor, a cable and a GIS bus and a man and beast each having a non-self restoring insulation from an over voltage which generates at an electric system. In an area where thundercloud, which may induce a thunderbolt, approaches, atmosphere air is ionized by an electric potential difference between thundercloud and ground. In addition, an ion having an opposite polarity corresponding to an ion in the atmosphere at a higher part of the ground increases. When the thundercloud increases, the ions are discharged by a corona effect at the higher part.

With the above principles, a lightening rod is installed at the top of a building. A corona discharge is formed through a rising top of the lightening rod when thundercloud increases, so that the ions are discharged for thereby inducing a thunderbolt.

Since the thunderbolt electric current induced by the lightening rod contains a high frequency component, it is needed to fast discharge through the ground. However, a ground impedance increases by an inherent resistance of the ground when a thunderbolt electric current is discharged to the ground through a ground rod, and a ground electric potential increases, so that an electric potential, which is applied to a protected instrument such as a large power facility instrument, a communication and weak electric current facility and an architectural facility, increases for thereby damaging the above facilities.

So as to overcome the above problems, as shown in FIG. 1, there is provided a Korean patent registration number 0339924 (arc induction type needle ground rod). In a ground rod which is connected with a protected instrument and is buried under the ground for thereby preventing a protected instrument installed on the ground from an insulation damage and erroneous operation by a thunderbolt electric current, the arc induction type needle ground rod comprises a ground rod which has an upper end connected with the protected instrument and a needle holder by which a needle is fixed movably in a circumferential direction so that arc can be easily generated when a surge voltage is supplied, a discharge tube which increases a ground resistance by increasing the surface area of a ground pole with respect to a commercial frequency failure electric current and maintains a zero electric potential based on a contact with the ground with respect to a surge-based high frequency failure electric current and receives and electrically insulates the ground rod so that arc can be easily generated at the needle, and an arc induction type coil which has one end connected with a lower side of the ground rod and the other end connected with a lower side of the discharge tube for thereby providing a path up to the discharge tube with respect to a commercial frequency failure electric current and induces a generation of arc by providing an electric potential difference between the needle and the discharge tube with respect to the surge-based high frequency failure electric current.

However, according to the needle ground rod of the Korean paten registration number 0339924, since a thunderbolt is applied through only the surface of the ground rod by a skin effect by a high frequency electric current when a thunderbolt falls, so that a resistance inductance causes many problems.

SUMMARY OF THE INVENTION

Accordingly, it is an object of the present invention to provide a ground rod having an induction discharge skin-effect plate which overcomes the problems encountered in the conventional art.

It is another object of the present invention to provide a ground rod having an induction discharge skin-effect plate in which an electric current inputted into a ground rod can be easily discharged to the ground by forming an induction discharge skin-effect plate in parallel with a ground rod at a certain interval and increasing a critical surface area when a thunderbolt falls. In addition, an electric potential increase of the ground can be lowered by allowing an electric potential discharge to take place between the upper and lower vertical portions of a ground rod and an induction discharge skin-effect plate when a thunderbolt falls.

It is further another object of the present invention to provide a ground rod having an induction discharge skin-effect plate which decreases an electric potential increase of the ground when a thunderbolt falls by generating an electric potential discharge by using an induction discharge skin-effect plate which is provided in parallel with a ground rod at a certain interval.

It is still further object of the present invention to provide a ground rod having an induction discharge skin-effect plate which induces a large ground pole effect when a thunderbolt electric current is inputted by allowing moisture of surrounding soil to be inputted into a surrounding portion of the ground rod by inputting a moisture absorber into the interior of the ground rod.

To achieve the above objects, in a ground rod which is connected with a ground facility through a lead cable and is buried under the ground with a certain depth, there is provided a ground rod having an induction discharge skin-effect plate which comprises a ground rod which is made of a copper or a conductive metallic material; at least one induction discharge skin-effect plate which is formed at a certain interval in a longitudinal direction of the ground rod; and a connection part of which one side is connected with the ground rod and the other side is connected with the induction discharge skin-effect plate, whereby an electric potential discharge occurs between the ground rod and the induction discharge skin-effect plate when a thunderbolt falls.

A plurality of through grooves are formed at the ground rod, and a moisture absorber is provided in the interior of the ground rod. The through grooves are formed at the upper side and the lower side of the ground rod, respectively.

The moisture absorber is one selected among silica gel, calcium chloride, dihydrate, anhydride, zeolite, calcium oxide, lime, calcium hydroxide, carbonic anhydride calcium, solid cellulose, starch and a mixture of the same.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

The ground rod having an induction discharge skin-effect plate according to the present invention will be described with reference to the accompanying drawings.

Figure 1:
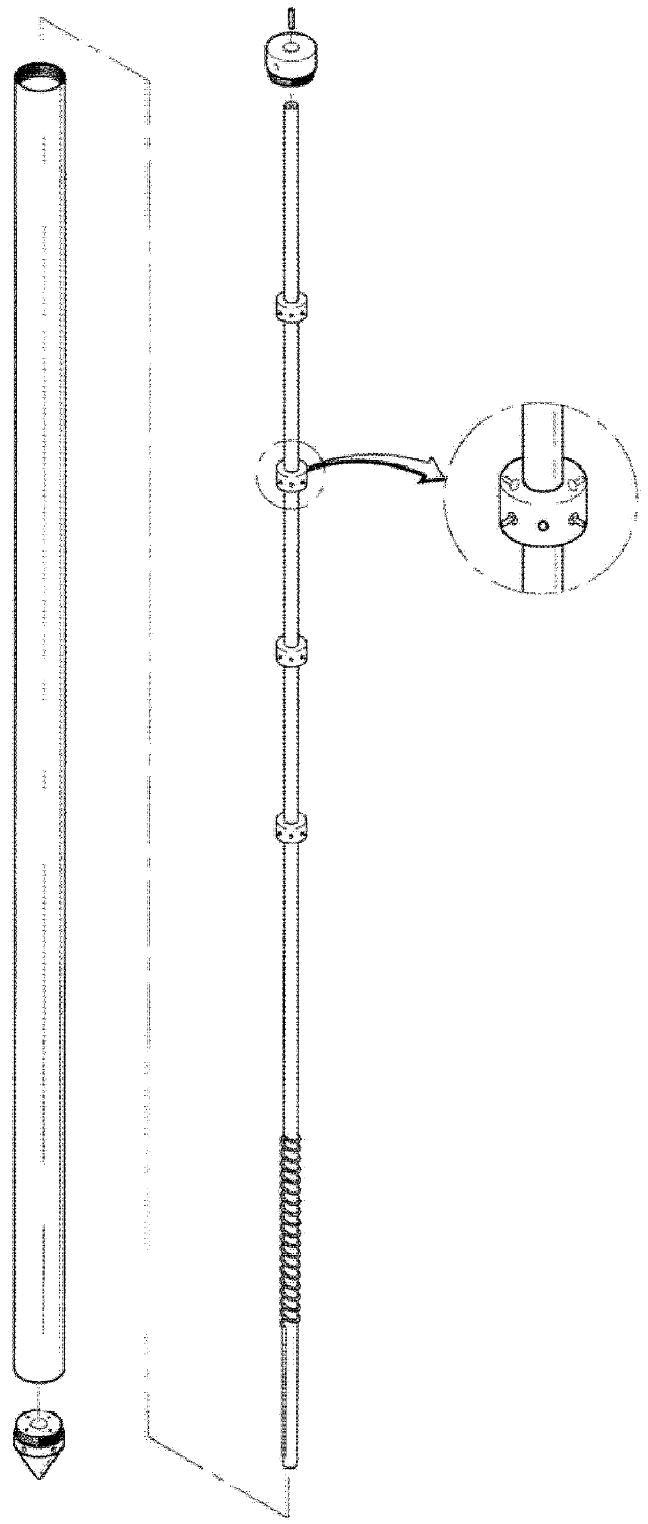
Figure 1 Prior Art
FIG. 1 is a disassembled perspective view illustrating a conventional ground rod.
Figure 2:
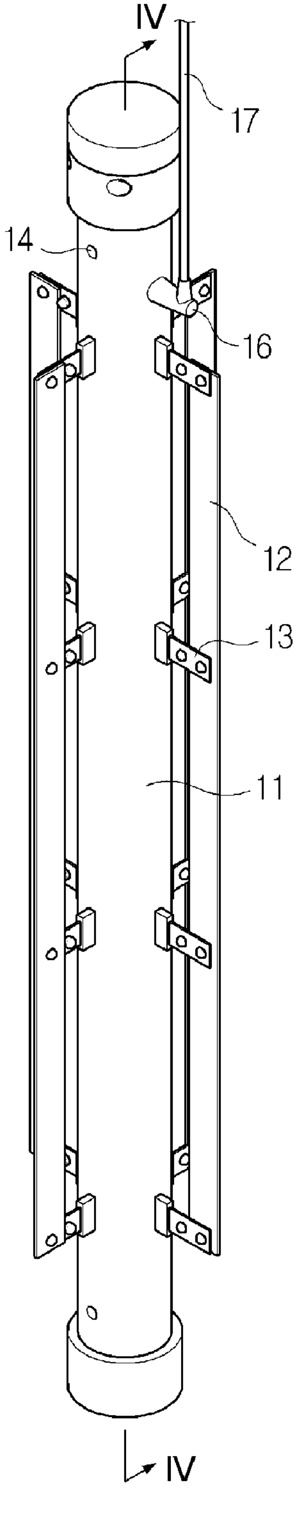
FIG. 2 is a perspective view illustrating a ground rod having an induction discharge skin-effect plate according to an embodiment of the present invention.
Figure 3:
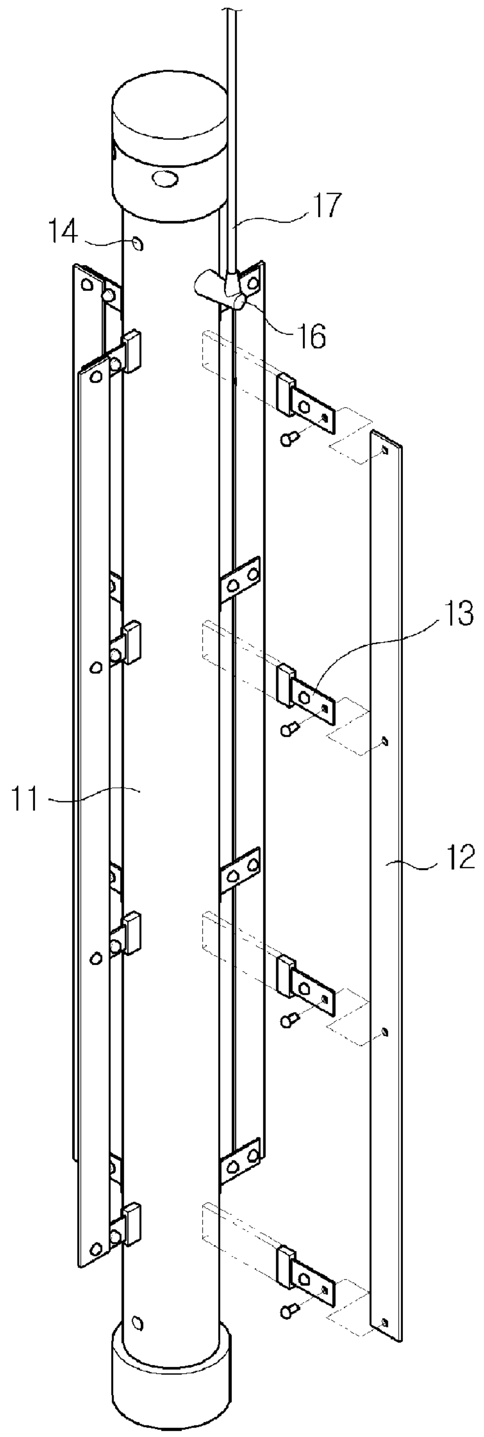
FIG. 3 is a disassembled view of FIG. 1.
Figure 4:
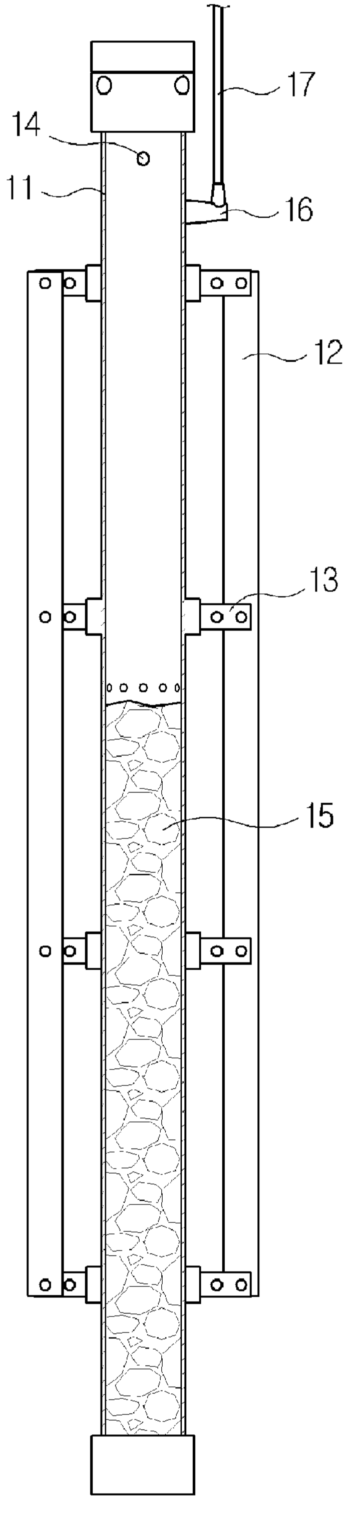
FIG. 4 is a cross sectional view taken along the line IV-IV of FIG. 2.
Figure 5:
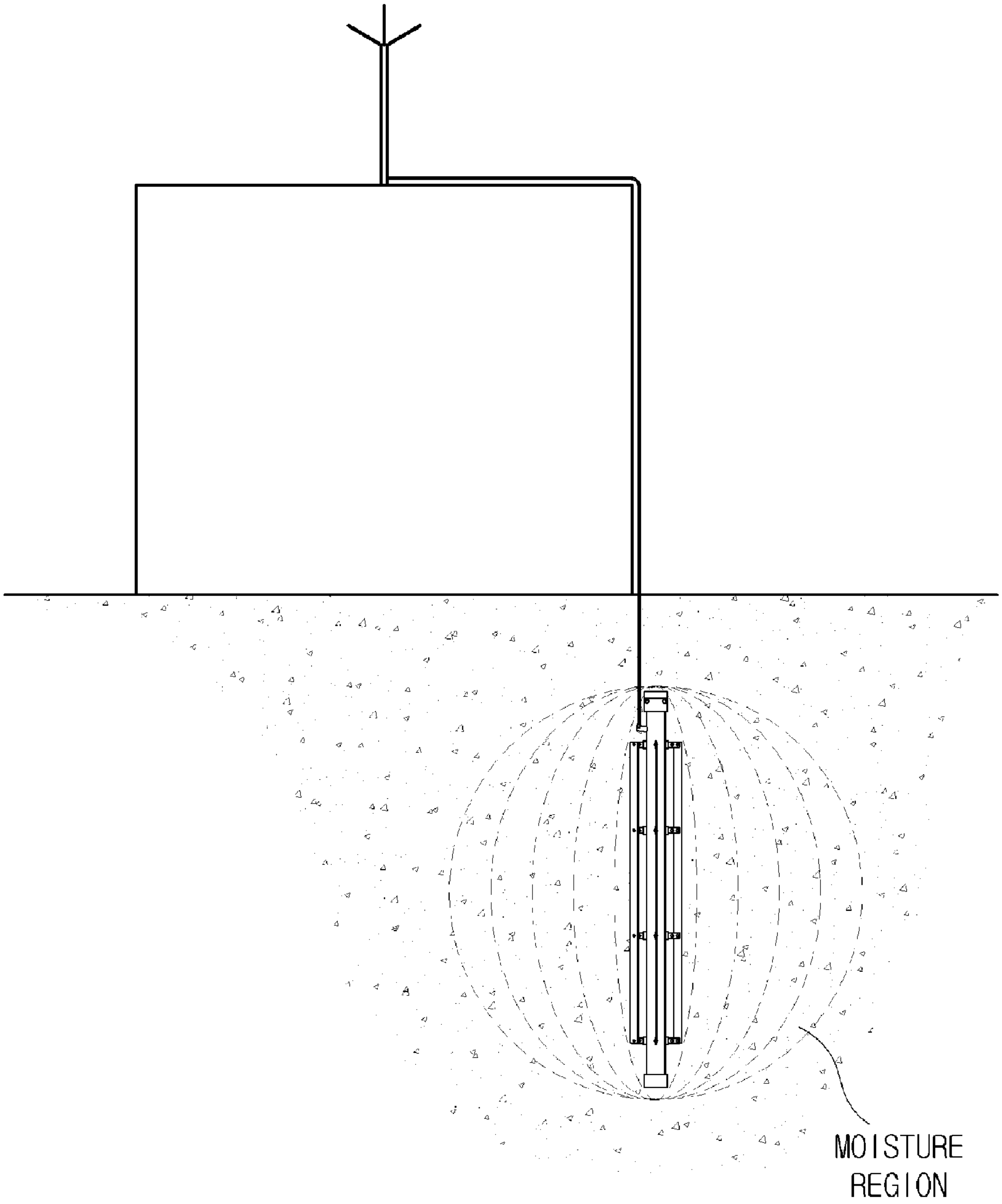
FIG. 5 is a view of a use state of a ground rod having an induction discharge skin-effect plate according to the present invention.
Figure 6:
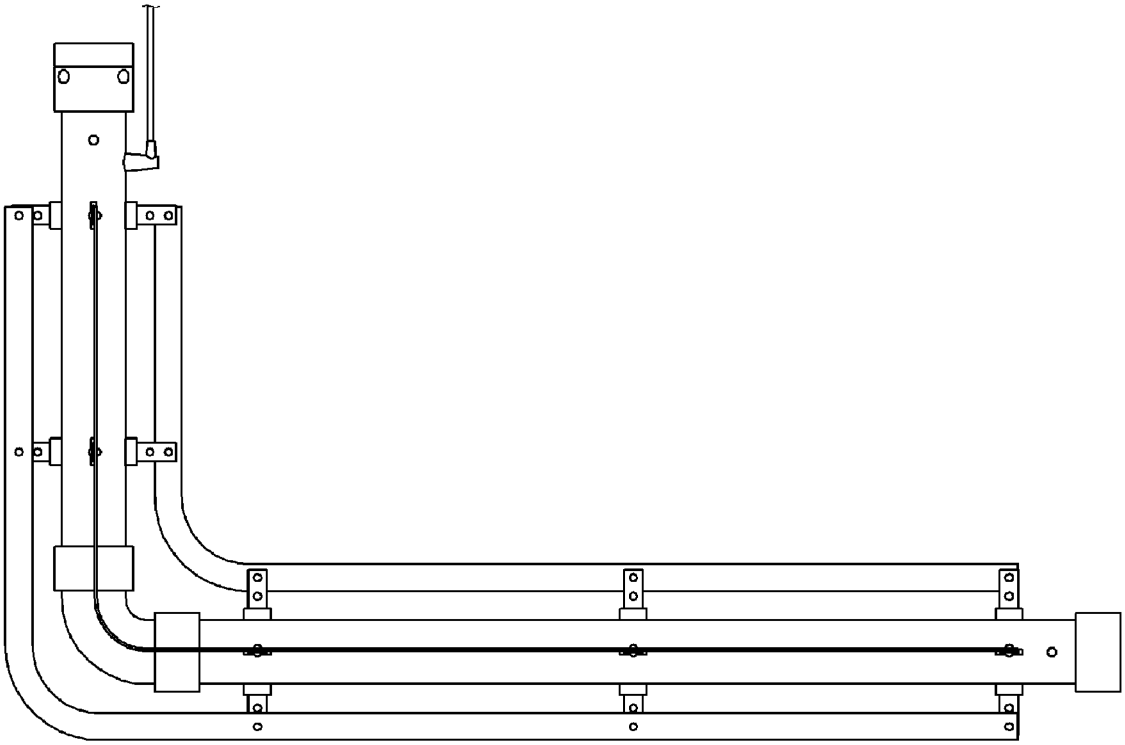
FIG. 6 is a view illustrating a ground rod having an induction discharge skin-effect plate according to another embodiment of the present invention.

FIG. 2 is a perspective view illustrating a ground rod having an induction discharge skin-effect plate according to an embodiment of the present invention, FIG. 3 is a disassembled view of FIG. 1, FIG. 4 is a cross sectional view taken along the line IV-IV of FIG. 2, FIG. 5 is a view of a use state of a ground rod having an induction discharge skin-effect plate according to the present invention, and FIG. 6 is a view illustrating a ground rod having an induction discharge skin-effect plate according to another embodiment of the present invention.

As shown in FIGS. 2 and 3, a ground rod according to the present invention comprises a copper or conductive metallic ground rod 11, an induction discharge skin-effect plate 12 installed at a certain interval in a longitudinal direction of the ground rod 11, and a conductive metallic connection part 13 which engages the ground rod 11 and the induction discharge skin-effect plate 12.

The ground rod is preferably hollow and is manufactured in a cylindrical column shape, but it may be formed in a T shape or a L shape.

Here, the induction discharge skin-effect plate 12 is provided in four directions, namely, in the forward, backward and leftward and rightward sides.

In addition, the connection part 13 is integral with the ground rod and is preferably engaged with the induction discharge skin-effect plate 12 using a bolt and nut.

In the ground rod 11 having the induction discharge skin-effect plate 12, when a thunderbolt electric current is inputted into the ground rod, since it is distributed into the skin-effect plate 12 along the connection part 13, a critical surface area increases, so that the inputted electric current can be easily discharged to the ground. In addition, an electric potential discharge occurs between the ground rod 11 and the induction discharge skin-effect plate 12, so that it is possible to decrease the electric potential increase of the ground when a thunderbolt falls.

As shown in FIG. 3, a plurality of through grooves 14 are formed at one side of the ground rod 11, and a moisture absorber 15 is provided in the interior of the ground rod 11 for absorbing the moisture of the ground. Here, the through grooves 14 may be formed at an outer surface of the ground rod, but they are preferably formed at the upper side and the lower side of the ground rod.

The moisture absorber 15 slowly absorbs the moisture contained in the ground through the through grooves formed at the upper side and the lower side of the ground rod, so that the soil of the surrounding portions of the ground rod 11 keeps moistures. So, when the thunderbolt electric current is inputted, a large ground pole effect may be obtained. Here, the moisture absorber may be made of one selected among silica gel, calcium chloride, dihydrate, anhydride, zeolite, calcium oxide, lime, calcium hydroxide, carbonic anhydride calcium, solid cellulose, starch, etc.

The operation of the ground rod according to the present invention will be described.

The moisture absorber 15 is placed in the interior of the ground rod 11, and the ground, on which the ground rod 11 is placed, is excavated, and the ground rod 11 is buried. Here, a ground cable 17 is electrically connected with a lead terminal 16 formed at one side of the ground rod, the thunderbolt electric current being applied through the ground cable 17. The above construction is a known art.

The soil of the surrounding portions of the ground rod keeps more moisture by the moisture absorber 15 of the interior of the ground rod as compared to the soil of the other portions, so that a certain moisture level is maintained in the soil. With the above construction, when a thunderbolt electric current is inputted, it becomes a large ground pole. The thunderbolt electric current generated when a thunderbolt falls is inputted into the ground rod 11 through the ground cable 17 and the lead terminal 16. Here, since the thunderbolt electric current is a high frequency component, when it is applied through a conductive material, it is distributed into the surface of the ground rod 11 and the surface of the skin-effect plate 12 based on a skin effect, so that it is possible to easily discharge through the ground.

In addition, an electric potential discharge occurs at the gap between the ground rod 11 and the induction discharge skin-effect plate 12 when a thunderbolt falls, so that an electric potential increase of the ground is decreased when a thunderbolt falls for thereby preventing a voltage which is applied in the reverse direction from the ground.

As described above, the ground rod having an induction discharge skin-effect plate according to the present invention can efficiently discharge an electric current, inputted into the ground rod, to the ground by distributing a thunderbolt electric current into the induction discharge skin-effect plate when a thunderbolt falls.

In addition, it is possible to decrease an electric potential increase of the ground by using an electric potential discharge occurring between the ground rod and the induction discharge skin-effect plate when a thunderbolt falls, so that the voltage applied in the reverse direction from the ground can be restricted.

The soil of the surrounding portions of the ground rod keeps moisture using the moisture absorber provided in the interior of the ground rod, so that it is possible to obtain a large ground pole effect.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. In a ground rod which is connected with a ground facility through a lead cable and is buried under the ground with a certain depth, a ground rod having an induction discharge skin-effect plate, comprising:

a ground rod (11) which is made of a copper or a conductive metallic material;

at least one induction discharge skin-effect plate (12) which is formed at a certain interval in a longitudinal direction of the ground rod (11); and a connection part (13) of which one side is connected with the ground rod (11) and the other side is connected with the induction discharge skin-effect plate (12), wherein a plurality of through grooves (14) are formed at the ground rod (11), and a moisture absorber (15) is provided in the interior of the ground rod, whereby an electric potential discharge occurs between the ground rod (11) and the induction discharge skin-effect plate (12) when a thunderbolt falls.

2. The ground rod of claim 1, wherein said through grooves (14) are formed at the upper side and the lower side of the ground rod (11), respectively.

3. The ground rod of claim 1, wherein said moisture absorber is one selected among silica gel, calcium chloride, dihydrate, anhydride, zeolite, calcium oxide, lime, calcium hydroxide, carbonic anhydride calcium, solid cellulose, starch and a mixture of the same.

* * * * *